No. 855,342. PATENTED MAY 28, 1907.
L. E. RICHMOND.
MOVEMENT CURE DEVICE.
APPLICATION FILED OCT. 4, 1906.

ATTEST.
E. M. Fisher
R. A. Ketcham

INVENTOR
Louis E. Richmond
By Fisher & Mosr ATTYS.

UNITED STATES PATENT OFFICE.

LOUIS E. RICHMOND, OF CLEVELAND, OHIO, ASSIGNOR OF ONE-THIRD TO HENRY J. HUNGER AND ONE-THIRD TO G. SCHEIDEGGER, BOTH OF CLEVELAND, OHIO.

MOVEMENT-CURE DEVICE.

No. 855,342.  Specification of Letters Patent.  Patented May 28, 1907.

Application filed October 4, 1906. Serial No. 337,357.

*To all whom it may concern:*

Be it known that I, LOUIS E. RICHMOND, a citizen of the United States, residing at Cleveland, in the county of Cuyahoga and State of Ohio, have invented certain new and useful Improvements in Movement-Cure Devices; and I do declare that the following is a full, clear, and exact description of the invention, which will enable others skilled in the art to which it appertains to make and use the same.

My invention relates to a movement cure device all substantially as shown and described and more particularly pointed out in the claims.

My device is adapted to produce a gyratory and vibratory movement which is essentially of a kneading or rolling character when applied to the body by means of suitable applicators. As a whole, the rolling, rocking action imparted is soothing and pleasant and without excessive shock or irritating power, although a heavy concussive stroke may be given by delivering the movement at right angles to the axis of rotation.

The device is designed for smooth and noiseless running and to give a cushioned application under varying degrees of pressure and with a minimum of friction under all conditions.

A further feature is embodied in the construction whereby the oil used in lubricating the parts is prevented from escaping or spattering during applicatory treatments.

Figure 1:
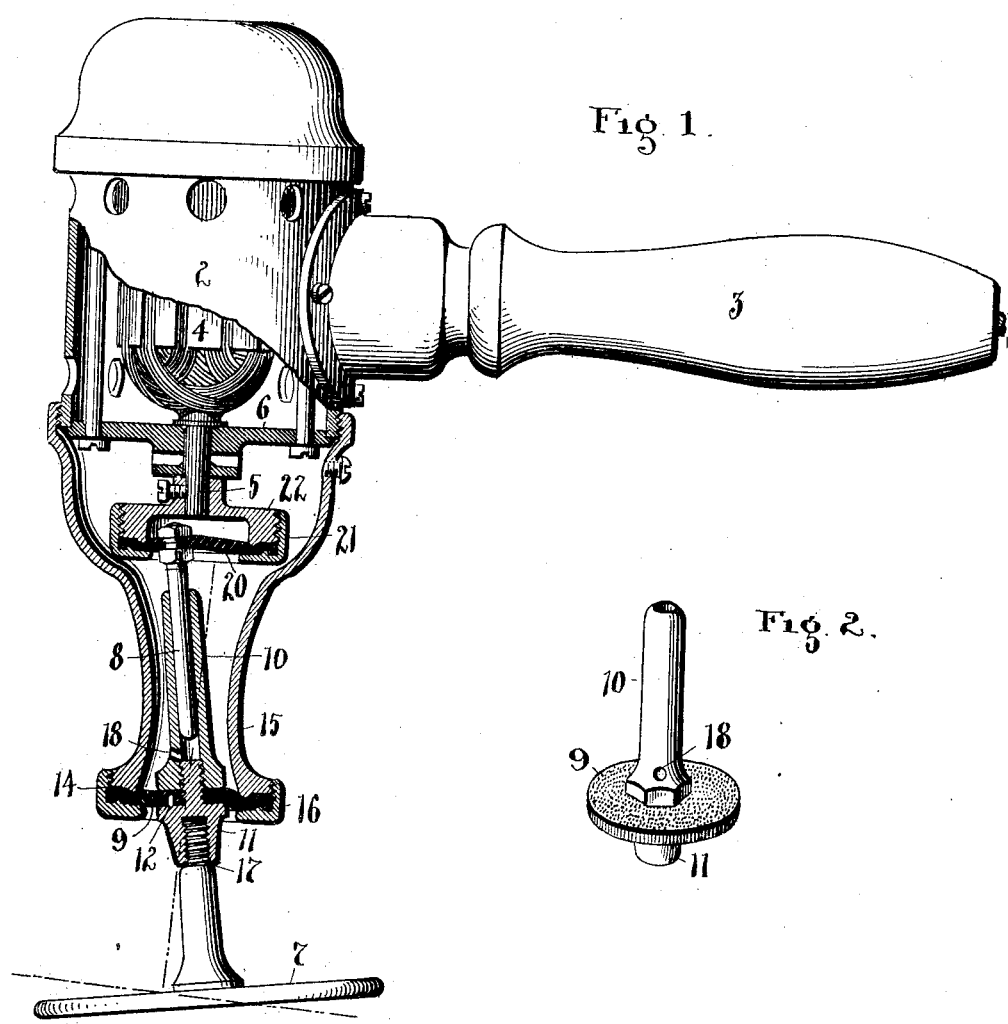
Figure 2:
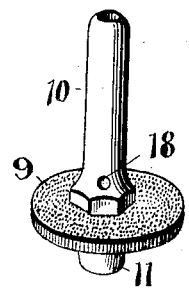

In the accompanying drawings, forming part of this specification, Figure 1 is a part side view and part sectional view of my improved device complete, and Fig. 2 is a perspective view of the gyratory support for the applicator.

The invention comprises a cylindircal casing —2— having a handle —3— wherewith it may be supported and the device applied to its work, and casing —2— confines a motor represented in this instance by armature part —4— having power shaft —5— extending through casing head —6—. It will be understood, however, that any suitable motor may be employed, as the main novelty of this invention rests in the power transmitting means and the flexible support for applicator —7—. Furthermore, any other applicator than the one shown may be used and to this end the same is shown as detachable.

The means and support referred to comprise a crank member —8— adapted to be revolved by shaft —5—, and a pliable or yielding diaphragm —9— having a tubular bearing —10— engaged by said crank member and adapted to support applicator —7—. Diaphragm —9— is made of rawhide or of any equivalent flexible or pliable material having the strength and durability to withstand a twisting strain, and tubular bearing —10— is firmly secured centrally of diaphragm —9— by screw nut —11— with said diaphragm between said parts. A pin —12— on nut —11— embeds itself into the diaphragm when the said parts are assembled and holds the nut in fixed position thereon. The diaphragm is clamped at its outer edge between the ribbed end face —14— of casing cap —15— and screw ring —16—, and nut —11— projects outwardly through said ring and is internally threaded to receive screw stem —17— of applicator 7.

Crank stem —8— is inclined to the axis of the power shaft and tubular bearing —10— and the parts carried thereby are necessarily held at the same inclination and are revolved in this angular position with diaphragm —9— as the center of the gyratory movement.

Any pressure upon applicator —7— is borne by the diaphragm which yieldingly plays in a limited degree and to this end bearing —10— is free to slide to accommodate a longitudinal movement thereof upon crank stem —8—. Thus, any excessive pressure upon the applicator is taken up by the diaphragm without appreciable increase of friction between the crank parts, and a cushioned application of the applicator is obtained in treatment that approaches a kneading rolling movement as nearly like hand movement as is possible. Furthermore, diaphragm —9— effectually closes the otherwise open end of casing cap —15— and prevents the escape and spattering of oil which is used to lubricate the metal engaging parts within the device, especially at the applicator end thereof. The oil tends to run downward to the applicator end because this is the natural position of the device when at work, and with my construction I not only avoid the objectionable features above noted but also utilize the oil thus trapped to keep the diaphragm in good flexible condition and to keep crank stem —8— well lubricated at all times through opening —18— near the bottom end of bearing —10.

Although leather diaphragm —9— and the arrangement of the crank connections hereinbefore described give a substantially noiseless action, I prefer to mount crank stem —8— on a cushioning diaphragm —20— as well, in order that all possible sound between the metallic parts —8— and —9—, respectively, be eliminated and insulated from the motor and the casing. Furthermore, a cushioned and yielding base for crank stem —8— assures accommodating movements and equalizing engagements between the crank parts and a corresponding smooth running of the applicator, especially when under pressure. As shown, cushioning diaphragm —20— is clamped by screw ring 21 upon crank head —22— which is secured to power shaft —5—, but any other equivalent construction may be employed which will yieldingly support or cushion crank stem —8—, preference being given to sound deadening or non-metallic materials.

What I claim is:

1. In a movement cure device, a power shaft and an applicator having operative connections therewith, and a yielding fulcrum support comprising a flexible diaphragm affixed to said operative connections and adapted to support said applicator.

2. In a movement cure device, a power shaft and an applicator having an actuating member connected therewith, a supporting casing for said parts, and a flexible non-metallic member mounted upon said casing and affixed to said actuating member and adapted to yieldingly support said applicator for vibratory movement.

3. In a movement cure device, an applicator having crank actuating connections and a power shaft therefor, a flexible member adapted to provide a fulcrum support for said applicator connections, and a sound absorbing member intervening said crank connections and said shaft.

4. In a movement cure device, an applicator and a crank member therefor, and a non-metallic support for said crank member adapted to insulate the metallic parts against sound.

5. In a movement cure device, an applicator and a crank member therefor, and a yielding non-metallic sound absorbing base member for said crank member.

6. In a movement cure device, an applicator and a flexible diaphragm providing a yielding fulcrum support therefor and connected therewith to sustain end pressure thereon and power means for operating said applicator.

7. In a movement cure device, an applicator and a flexible diaphragm providing a yielding fulcrum support therefor, operating connections for said applicator, and a sound absorbing member in the line of said connections.

8. In a movement cure device, an applicator and a flexible diaphragm support therefor having an operating member, and a power operated crank member rotatably and slidably engaged with said first member.

9. In a movement cure device, an applicator and a flexible support therefor having a crank operated member affixed thereto, in combination with power means and a flexibly supported crank stem adapted to engage said member.

10. In a movement cure device, an applicator and a flexible diaphragm support therefor, a power shaft and an angularly disposed crank stem and diaphragm member adapted to impart gyratory movement to said applicator.

11. In a movement cure device, a casing and power transmitting means supported thereby, in combination with an applicator, operating connections between said power means and said applicator, and a working chamber for said operating connections closed at all points and provided with a diaphragm affixed to both said casing and said operating connection.

12. In a movement cure device, a motor and a casing therefor having a removable cap at one end, a flexible diaphragm removably mounted upon said cap, an applicator supported by said diaphragm, and a crank member operated by said motor and adapted to gyrate said applicator.

13. In a movement cure device, a motor and a casing support therefor having a removable cap at one end, a flexible diaphragm removably mounted upon said cap, a tubular crank bearing and locking nut affixed to said diaphragm, an inclined crank pin carried by said motor and engaged with said bearing, in combination with an applicator adapted to be operatively supported by said parts.

14. In a movement cure device, a motor and a casing having a removable cap, a flexible diaphragm supported by said cap and an applicator operating member supported by said diaphragm, and a crank member having a diaphragm support operatively connected with said motor, in combination with an applicator detachably secured to said applicator operating members.

In testimony whereof I sign this specification in the presence of two witnesses.

LOUIS E. RICHMOND.

Witnesses:
R. B. MOSER,
R. A. KETCHAM.